March 21, 1950 N. C. BARFORD 2,501,303

TUNING MECHANISM FOR HOLLOW ELECTRICAL RESONATORS

Filed Sept. 15, 1945

INVENTOR.
NORMAN CHARLES BARFORD.

BY H. S. Grover

ATTORNEY.

Patented Mar. 21, 1950 2,501,303

UNITED STATES PATENT OFFICE 2,501,303

TUNING MECHANISM FOR HOLLOW ELECTRICAL RESONATORS

Norman Charles Barford, Hayes, England, assignor to Electric & Musical Industries Limited, Hayes, Middlesex, England, a company of Great Britain Application September 15, 1945, Serial No. 616,620
In Great Britain July 13, 1944

Section 1, Public Law 690, August 8, 1946
Patent expires July 13, 1964

4 Claims. (Cl. 74—479)

This invention relates to tuning mechanism for hollow electrical resonators such as are employed in electron discharge devices of the velocity-modulation type or for other purposes.

Such resonators can be tuned in a variety of manners and various mechanisms have heretofore been proposed for that purpose. It is also desirable for the mechanism to afford a coarse and fine tuning control and several proposals have been made for effecting such control, such as the provision of differential screws, differential levers and the like. Most of these prior proposals have, however, been found to be unsatisfactory in practice mainly due to difficulty of manufacture owing to the accuracy required, especially when used with very small resonators, multiplicity of parts and sensitivity to finger pressure when operating the mechanism.

The object of the present invention is to provide an improved mechanism for tuning a hollow resonator which will afford coarse and fine tuning and which will overcome or reduce the above-mentioned disadvantages which arise with the known forms of tuning mechanism.

According to the invention there is provided a tuning mechanism for a hollow electrical resonator comprising a pivotally-mounted adjustable element, means for causing said element to pivot about a plurality of axes and means for communicating the motion of said element to the adjustable part of said resonator so as to cause tuning of said resonator, the arrangement being such that pivotal movement of said element about one of said axes serves to effect a coarse adjustment of said part whilst movement about another axis serves to effect a fine adjustment of said part.

In order that the said invention may be clearly understood and readily carried into effect it will now be more fully described with reference to the accompanying drawings in which—

Figure 1:
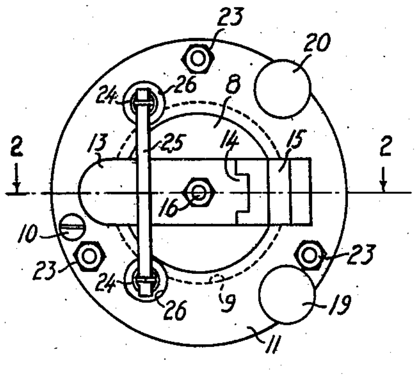
Figure 1 is a plan view of a tuning mechanism according to the invention.
Figure 2:
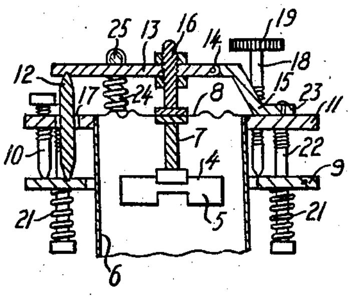
Figure 2 is a cross-sectional view taken along the line 2—2 of Figure 1, and looking in the direction of the arrows.

Referring now to Figures 1 and 2 of the drawings, the tuning mechanism shown is employed by way of example to cause deflection of the wall 4 of a hollow toroidal resonator 5 so as to cause a change of tuning mainly by varying the width of the gap at the centre of the resonator. The tuning mechanism can however be employed to effect tuning of the resonator in any other suitable manner. The resonator 5 is shown located and supported by means not shown, in an envelope, part of which is indicated at 6 and the wall 4 is connected by a rod 7 to a flexible diaphragm 8 by means of which movement can be communicated to the wall 4 from the exterior of the envelope 6 whilst maintaining the space within the envelope 6 vacuum or gas-tight. The tuning mechanism shown comprises an adjustable element 9 in the form of a ring surrounding the envelope 6, the ring 9 being pivotally-mounted on a pivot in the form of a pointed screw 10 which is threaded into a support 11 in the form of a ring rigidly secured relatively to the envelope 6. Pivotal movement of the ring 9 is communicated to the diaphragm 8 and thus to the wall 4 of the resonaor by a rod 12 having pointed ends, one end of which engages in a suitably-shaped depression in the ring 9 and the other end of which engages in a suitably-shaped depression formed in an actuating member 13 which is hingedly mounted at 14 to a support 15 secured to the rigid ring 11. The actuating member 13 is connected to the diaphragm 8 by a rod 16, as indicated. The rod 12 extends through an aperture 17 in the rigid ring 11 and it will be appreciated therefore that when the ring 9 is caused to move about the pivot 10 the rod 12 will be moved substantially axially causing the actuating member 13 to turn about its hinge 14 thereby causing the rod 16 to move substantially axially so as to cause the wall 4 to move towards or away from the opposite wall of the resonator. Pivotal movement of the ring 9 is arranged to effect both a coarse and fine control of tuning. In order to effect a fine control of tuning an adjusting screw 18 is provided having a knurled knob 19, the screw 18 being threaded into the rigid ring 11 and having a pointed end bearing against the ring 9. In order to effect a coarse control of tuning a similar screw is provided having a knurled knob 20 and which is also threaded into the rigid ring 11 and having a pointed end bearing on the ring 9. Since as will hereinafter appear the pivotal movement of the ring 9 is greater under the action of the screw for effecting a coarse control compared with its movement when actuated by the screw 18, it is preferred to provide a channel in the ring 9 with which the pointed end of the coarse control screw engages the channel being suitably arranged along the line AB, Figure 3, hereinafter more fully referred to so as to allow the ring 9 to move more freely relatively to the point of the screw and to locate the axis about which the ring 9 pivots for fine control. The ring 9 is maintained in contact with the pivot 10 and the rod 12 by means of a number of compression springs 21, these compression springs being disposed between the lower surface of the ring 9 and the heads of bolts 22 which are threaded into the rigid ring 11 and secured by nuts 23. Tension springs between the rings 9 and 11 could alternatively be used. The actuating member 13 is maintained in contact with the upper end of the rod 12 by means of tension springs 24 which are secured to the end of a cross bar 25 attached to the actuating member 13, the springs 24 passing through apertures 26 in the ring 11 and being anchored to the ring 9.

The disposition of the coarse and fine adjusting screws is so arranged in relation to the pivot 10 as to cause the ring 9 to pivot about two axes, pivotal movement about one axis effecting a coarse control of tuning and pivotal movement about the other axis causing a fine control of tuning. In order to explain how the coarse and fine control of tuning is effected, reference will now be made to Figure 3 of the drawings in which the point A corresponds to the point where the coarse control screw engages the ring 11, the point B corresponds to the pivot formed by the screw 10 and the point C corresponds to the point where the fine control screw 18 engages the ring 9. The point D corresponds to the point where the rod 12 engages the ring 9. The line AQ is perpendicular to line BC, the line CP is perpendicular to AB, the line DD′ is parallel to AB and the line DD″ is parallel to BC. If the points B and C are fixed and the point A is moved at right angles to the plane of the paper, the plane ABC will pivot about the axis BC and the ratio of the movement of point D to that of point A will be $$\frac{D''Q}{AQ}$$

Similarly, if points A and B are fixed and point C is moved at right angles to the plane of the paper, the plane ABC will pivot about the axis AB and the ratio of movement of point D to that of point C will be $$\frac{D'P}{CP}$$

Figure 3:
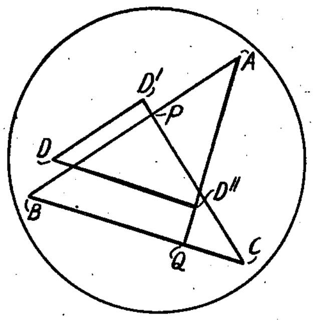
Figure 3 is an explanatory diagram for explaining the operation of the mechanism shown in Figures 1 and 2.

Thus, it is possible to obtain two rates of movement of the point D, these rates being dependent on the relative positions of the points A, B, C and D. In Figure 3 the point D is much closer to AB than to BC and thus movement of the point C effects a fine control and movement of point A effects a coarse control. In Figure 3 the point D is shown outside the triangle ABC although it will be appreciated that this is not essential since the point D may, if desired, be located inside the triangle ABC according to the different rates of tuning required and according to the direction in which the point D is required to move on movement of the points A and C.

What I claim is:

1. Tuning mechanism for a hollow electrical adjustable resonator comprising a pivotally-mounted adjustable element, means for causing said element to pivot about a plurality of axes and means for communicating the motion of said element to the adjustable part of said resonator so as to cause tuning of said resonator, said adjustable element and said means being so constructed and arranged that pivotal movement of said element about one of said axes serves to effect a coarse adjustment of said part whilst movement about another axis serves to effect a fine adjustment of said part, said pivotally-mounted adjustable element cooperating with three points of pivotation, two of said points determining the axis about which said element pivots for effecting a coarse adjustment of tuning and the third point and one of said two points determining the axis about which said element pivots for effecting a fine adjustment of tuning, a connecting member linking said pivotally-mounted adjustable element and said adjustable part of said resonator, the location and arrangement of said connecting member relative to said points being such as to determine the relative rates of movement of said part for coarse and fine tuning of said resonator.

2. Tuning mechanism for a hollow electrical adjustable resonator comprising a pivotally-mounted adjustable element, means for causing said element to pivot about a plurality of axes and means for communicating the motion of said element to the adjustable part of said resonator so as to cause tuning of said resonator, said adjustable element and said means being so constructed and arranged that pivotal movement of said element about one of said axes serves to effect a coarse adjustment of said part whilst movement about another axis serves to effect a fine adjustment of said part, said pivotally-mounted adjustable element cooperating with three points of pivotation, two of said points determining the axis about which said element pivots for effecting a coarse adjustment of tuning and the third point and one of said two points determining the axis about which said element pivots for effecting a fine adjustment of tuning, a connecting member linking said pivotally-mounted adjustable element and said adjustable part of said resonator, the location and arrangement of said connecting member relative to said points being such as to determine the relative rates of movement of said part for coarse and fine tuning of said resonator, said pivotally-mounted adjustable element being in the form of a ring surrounding the axis of said resonator, said ring bearing against a normally fixed pivot and cooperating with two adjusting screws which determine in conjunction with said normally fixed pivot the axes about which said ring pivots.

3. Tuning mechanism for a hollow electrical adjustable resonator comprising a pivotally-mounted adjustable element, means for causing said element to pivot about a plurality of axes and means for communicating the motion of said element to the adjustable part of said resonator so as to cause tuning of said resonator, said adjustable element and said means being so constructed and arranged that pivotal movement of said element about one of said axes serves to effect a coarse adjustment of said part whilst movement about another axis serves to effect a fine adjustment of said part, said pivotally-mounted adjustable element cooperating with three points of pivotation, two of said points determining the axis about which said element pivots for effecting a coarse adjustment of tuning and the third point and one of said two points determining the axis about which said element pivots for effecting a fine adjustment of tuning, a connecting member linking said pivotally-mounted adjustable element and said adjustable part of said resonator, the location and arrangement of said connecting member relative to said points being such as to determine the relative rates of movement of said part for coarse and fine tuning of said resonator, said pivotally-mounted adjustable element being in the form of a ring surrounding the axis of said resonator, said ring bearing against a normally fixed pivot and cooperating with two adjusting screws which determine in conjunction with said normally fixed pivot the axes about which said ring pivots, and a pivotally-mounted actuating member coupled to said adjustable part of said resonator, said connecting member extending between said ring and said actuating member.

4. Tuning mechanism for a hollow electrical adjustable resonator comprising a pivotally-mounted adjustable element, means for causing said element to pivot about a plurality of axes and means for communicating the motion of said element to the adjustable part of said resonator so as to cause tuning of said resonator, said adjustable element and said means being so constructed and arranged that pivotal movement of said element about one of said axes serves to effect a coarse adjustment of said part whilst movement about another axis serves to effect a fine adjustment of said part, said pivotally-mounted adjustable element cooperating with three points of pivotation, two of said points determining the axis about which said element pivots for effecting a coarse adjustment of tuning and the third point and one of said two points determining the axis about which said element pivots for effecting a fine adjustment of tuning, a connecting member linking said pivotally-mounted adjustable element and said adjustable part of said resonator, the location and arrangement of said connecting member relative to said points being such as to determine the relative rates of movement of said part for coarse and fine tuning of said resonator, said connecting member engaging said adjustable element in a plane which is different from the plane containing said points.

NORMAN CHARLES BARFORD.

REFERENCES CITED

The following references are of record in the file of this patent:

UNITED STATES PATENTS

| Number | Name | Date |
|---|---|---|
| 1,579,482 | Jorgensen | Apr. 6, 1926 |
| 2,263,184 | Mouromtseff | Nov. 18, 1941 |
| 2,406,372 | Hansen | Aug. 27, 1946 |
| 2,439,387 | Hansen | Apr. 13, 1948 |